United States Patent
Snapp

(10) Patent No.: US 7,415,171 B2
(45) Date of Patent: Aug. 19, 2008

(54) MULTIGRAPH OPTICAL CHARACTER READER ENHANCEMENT SYSTEMS AND METHODS

(75) Inventor: Robert F. Snapp, Memphis, TN (US)

(73) Assignee: United States Postal Service, Washington, DC (US)

(*) Notice: Subject to any disclaimer, the term of this patent is extended or adjusted under 35 U.S.C. 154(b) by 17 days.

(21) Appl. No.: 11/390,341

(22) Filed: Mar. 28, 2006

(65) Prior Publication Data

US 2006/0215937 A1  Sep. 28, 2006

Related U.S. Application Data

(60) Provisional application No. 60/665,365, filed on Mar. 28, 2005.

(51) Int. Cl.
*G06K 9/03* (2006.01)
(52) U.S. Cl. .................................................. 382/311
(58) Field of Classification Search ................ 382/161, 382/225–226, 228–231, 311
See application file for complete search history.

(56) References Cited

U.S. PATENT DOCUMENTS

| | | | | |
|---|---|---|---|---|
| 4,754,489 A | * | 6/1988 | Bokser | 382/230 |
| 5,133,023 A | * | 7/1992 | Bokser | 382/230 |
| 5,261,009 A | * | 11/1993 | Bokser | 382/230 |
| 7,031,519 B2 | * | 4/2006 | Elmenhurst | 382/181 |

* cited by examiner

*Primary Examiner*—Jose L Couso
(74) *Attorney, Agent, or Firm*—Finnegan, Henderson, Farabow, Garrett & Dunner, L.L.P.

(57) ABSTRACT

Systems, methods, and software consistent with the present invention use combinations of two or more letters (xgraphs) or characters, such as three letter combinations (trigraphs), to aid in deciphering ambiguous characters in OCR systems. Embodiments consistent with the invention compare possible xgraphs constructed by substitution for the ambiguous OCR-read character(s) to a reference set of xgraphs. The reference set of xgraphs contains predetermined valid xgraphs, which may be ranked by preference. If a possible xgraph matches a reference xgraph, then the ambiguous character(s) are resolved in favor of the characters in the reference xgraph. Embodiments may also use the context of the ambiguous character string to aid in resolving the ambiguity where more than one possible solution exists.

30 Claims, 11 Drawing Sheets

110 s?cre?ar?

| left | middle | right |
|------|--------|-------|
| s?c  | ?cr<br>re?<br>e?q<br>?ar | ar? |

FIG. 1C

185 secretary

FIG. 1D

| | Trigraph | Ref. Table Probed | Matches a Ref? |
|---|---|---|---|
| 520 | don | Left | Y |
| 525 | aad | Right | Y |
| 530 | ona | Middle | Y |
| 535 | naa | Middle | Y |

| Trigraph | Ref. Table Probed | Matches Ref? |
|---|---|---|
| don | Left | Y |
| abd | Right | N |
| ona | Middle | Y |
| nab | Middle | Y |

FIG. 6

| Name Permutations | Occurrence Value |
|---|---|
| donaid | 1,244 |
| donald | 366,298 |
| donard | 211 |

| Name | Rank |
|------|------|
| donald | 1 |
| donaid | 2 |
| donard | 3 |

MULTIGRAPH OPTICAL CHARACTER READER ENHANCEMENT SYSTEMS AND METHODS

RELATED APPLICATIONS

This application claims the benefit of U.S. Provisional Application No. 60/665,365 filed Mar. 28, 2005, by Robert F. Snapp, which is hereby incorporated herein by reference.

DESCRIPTION OF THE INVENTION

1. Field of the Invention

This invention generally relates to optical character recognition and, more specifically, to deciphering ambiguous characters in a field of a known type.

2. Background

Generally speaking, optical character recognition ("OCR") systems are computerized systems that "read" or interpret information, typically text, from physical objects. OCR systems typically employ a scanner or digital camera to produce a graphical representation of the text or an electronic image of the text, which is interpreted as characters by software or firmware.

Optical character recognition systems are widely employed to perform various tasks. For example, OCR systems are used to input documents into office and business word processing systems, read books for users with vision impairments, read sheet music played by computerized music systems, read text in one language for translation to another, and to produce metadata, such as an index or keyword, to associate with an image of an item or a document, among other things.

In an item delivery environment, OCR systems are employed to read or interpret information on items that need to be delivered, such as a piece of mail or a package, by identifying the address on the face of the delivery item and then translating the shapes within the address into letters and numbers. The address's letters and numbers are then processed to attempt to determine the name and address or the intended recipient.

In the case of the U.S. Postal Service ("USPS"), the address data is compared to the USPS's address database. Other delivery services may have their own corresponding databases. If a match occurs with an address in the database, a barcode representing the address is applied to the item. The barcode is used by automated sorting equipment to direct the item to a delivery person for ultimate delivery to the addressee.

The addressee information may be used for other purposes in addition to automating the sorting of items for delivery. For example, the USPS uses the addressee information to determine whether the addressee has filed a change-of-address ("COA") order with the USPS. In USPS systems, the change-of-address information is derived from the USPS National Change of Address ("NCOA") system, and is provided to OCR sorting systems as a data product called NCOALink. Other delivery services may have similar systems and requirements. During typical processing of items for delivery, the USPS stores change of address information in a database, and the name data and the address data on items passing through the delivery system are processed with reference to the database to determine if a COA order is on file for a customer with that name at the address in question. If the customer has filed a COA order, a barcode representing the new customer address, along with the text of the new address, is "sprayed," that is, applied, to the delivery item, and it is directed to the new address. Other delivery services may have similar change of address processing.

Various users of OCR technology can accept various degrees of accuracy in the output of the character determination process. For example, a few errors in a Microsoft Word™ word processing document generated by OCR scanning of a hardcopy report may be satisfactory to a home office user. On the other hand, an item delivery service may have strict rules regarding character-determination accuracy in OCR systems used for the automated forwarding of delivery items. For example, the USPS is required to determine with a high degree of certainty that the addressee name determined by an OCR system and any matching COA order are for the same individual, family, or business before forwarding mail to the new address.

Accuracy problems may arise during the reading process when the OCR systems makes an interpretation for each character. For ambiguous characters, i.e., those not clearly recognizable as a specific letter, number, punctuation remark, symbol, etc., an OCR system may create two or more alternate possibilities for its interpretation of the ambiguous character. Occasionally, an OCR system is unable to identify or even form a guess interpretation for an ambiguous character. This causes difficulties because possible interpretations based only on the information scanned from an object (or the absence of an interpretation) do not provide enough accuracy for item delivery services and other OCR uses that require high certainty of character resolution and word resolution.

For some applications, OCR processes must be performed very quickly. For example, in item delivery sorting systems, OCR readers typically must read about 40,000 item addresses per hour. Within a short span of time, the system must read an item, interpret the address characters, update the address (if necessary), spray the item with the correct address barcode, and sort the item for delivery. As part of this processing, the OCR system must identify the addressee name and address components on the item, process the name to determine whether the addressee has moved from the address on the item, and match the address to the correct delivery code, such as a ZIP+4™ delivery code. If these operations cannot be performed quickly enough, sorting systems typically shunt the offending item out of the automated high speed sorting stream to undergo much slower manual sorting operations.

When a character string, such as an addressee name, contains an ambiguous character, downstream processing time increases as subsequent operations deal with the unknown character. For example, item delivery systems take longer to determine a correct delivery address for an ambiguous name as a result of attempting to match many permutations of the name with change-of-address data. Each ambiguous letter character could involve as many as 26 possible interpretations. A name string with three ambiguous characters could require more than 17,000 look-ups. Obviously, this amount of processing greatly increases the time it takes to process a single addressed item. Moreover, if the system is unable to accurately determine the name within the allotted time, an opportunity to forward the item to the correct address as part of the automatic mainstream sorting operation is lost, negatively affecting efficiency and throughput.

In USPS experience, 500-700 of the 40,000 items processed per hour (about 1.5%) require the application of a new address based on information from customer-provided COA orders. Consequently, any delay in this processing can greatly decrease the efficiency of delivery item sorting.

Accordingly, it is desirable, among other things, to increase the accuracy of OCR processes and reduce the processing time.

SUMMARY OF THE INVENTION

Systems, methods, and software consistent with the present invention use combinations of two or more letters (xgraphs), such as three letter combinations (trigraphs), to aid in resolving ambiguous characters in OCR systems. Embodiments consistent with the invention compare possible xgraphs constructed by substitution for the ambiguous OCR-read character(s) to a reference set of xgraphs. The reference set of xgraphs contains predetermined valid xgraphs, which may be ranked by preference. If a possible xgraph matches a reference xgraph, then the ambiguous character(s) are resolved in favor of the letters in the reference xgraph.

The invention provides system and method embodiments for resolving an ambiguous character in a character string read by an OCR system, comprising components and operations for forming string permutations of the character string by substituting a plurality of replacement characters for the ambiguous character; deriving xgraphs from the string permutations; matching the xgraphs with a reference set of valid xgraphs; creating solution permutations by removing from the string permutations any string permutation containing an xgraph that does not match a valid xgraph in the reference set; and outputting the solution permutations.

Some embodiments consistent with the invention also rank the solution permutations by likelihood of being a correct interpretation of the character string. Some embodiments further determine the likelihood based on the context of the character string in relation to another character string read by the OCR system or determine the likelihood based on a predetermined statistic from a plurality of character strings corresponding to the character string read by the OCR system. In some embodiments, the predetermined statistic is frequency of occurrence. In yet other embodiments, the xgraph is one of a group comprising: a group of two characters, a group of three characters, a group of four characters, and a group of five characters.

Advantages of the invention will be set forth in part in the description which follows, and in part will be obvious from the description, or may be learned by practice of the invention.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

FIGS. 1B-1D illustrate exemplary input, processing, and output information used by an OCR system embodiment consistent with the invention;

FIG. 6 illustrates an exemplary result of probing a reference name table for xgraphs that match the xgraphs in another candidate character string permutation;

FIG. 7 is a representative table showing the results of probing a reference name table for names that match candidate character string permutations;

FIG. 8 is an exemplary results table illustrating the ranking by frequency of occurrence of character string permutations.

DESCRIPTION OF EXEMPLARY EMBODIMENTS

Reference will now be made in detail to embodiments of the invention, examples of which are illustrated in the accompanying drawings. Wherever convenient, the same reference numbers will be used throughout the drawings to refer to the same or like parts.

Figure 1A:
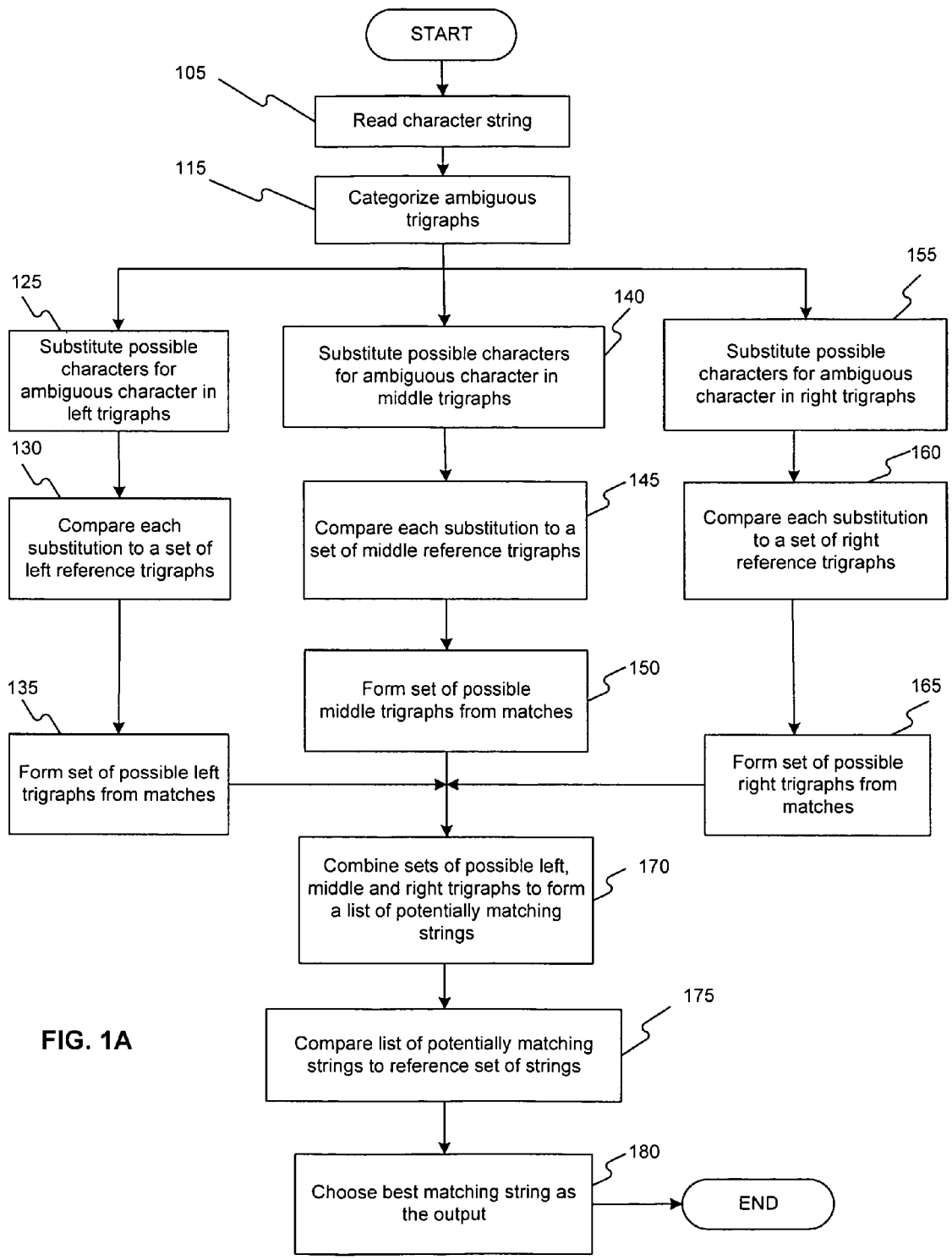
FIG. 1A is a flowchart representing an exemplary OCR process consistent with the invention.

FIG. 1A is a flowchart representing an exemplary OCR process consistent with the invention. As shown, the process begins with an OCR system reading a character string (stage 105). The character string may be printed on a variety of objects, such as a piece of paper, sheet music, an object for sale, the packaging of an item, a package for delivery, an envelope for delivery, a form, a legal document, etc. For example, the character string may be a word entered into an employment application form in a space entitled "position applying for."

When the OCR system reads the character string, the system may recognize some of the characters in the string, may partially recognize some of the characters in the string, or may not recognize at all some of the characters in the string. As shown in FIG. 1B, for example, in reading a word entered into the "position applying for" space in an employment application, the OCR system may recognize six characters of a nine character string "s?cre?ar?" 110, denoting the unrecognized characters as question marks to show that they are ambiguous characters. OCR systems and methods for initially reading and recognizing characters are known in the art, and the exact such system and method used for this stage are not critical to the invention.

Next, as shown in FIG. 1A, the OCR system divides the read-in character string into trigraphs, that is, three-letter combinations and categorizes each ambiguous trigraph in the character string to begin resolving the ambiguities (stage 115). An ambiguous trigraph is a trigraph containing at least one character that the OCR system does not fully recognize, such as the letters replaced by question marks in character string 110 in FIG. 1B. Although trigraph literally means a three-letter combination, which is an appropriate size for this embodiment, the invention is not limited to three-letter combinations or even to letters. The term trigraph is used herein to refer to combinations of three characters of any type, including letters, numbers, symbols, etc. In addition, the invention is not limited solely to trigraphs, i.e., three-character combinations, but includes xgraphs, i.e., other multi-character combinations, as well.

As represented by table 120 in FIG. 1C, one embodiment of a system consistent with the invention categorizes ambiguous trigraphs by placing each trigraph in one of three categories: left, middle, or right. Left refers to the leftmost trigraph in a character string, i.e., the first three letters of a word. Right refers to the rightmost trigraph in a character string, i.e., the last three letters of a word. Middle refers to any trigraph that is not in the left or right categories.

As shown in table 120, the ambiguous character string "s?cre?ar?" includes the ambiguous left trigraph "s?c," the ambiguous right trigraph "ar?," and four ambiguous middle trigraphs "?cr," "re?," "e?a," and "?ar."

Next, as shown in FIG. 1A, the OCR system substitutes possible replacement characters for the ambiguous character for each trigraph in each category to form a set of permutations of each trigraph (stages 125, 140, and 155). In one embodiment consistent with the invention, the system may be designed to regard the read-in character string as a word, so the possible characters that can be substituted are the letters a through z, and thus 26 substitute trigraphs may be formed for an xgraph having one ambiguous character. In other embodiments consistent with the invention, the character string read is not necessarily regarded as a word, and the possible characters may include numbers, symbols, and other characters. In still other embodiments consistent with the invention, the read-in character string is a number, and the possible substitute characters include only the digits 0 through 9.

In some embodiments consistent with the invention, the set of possible substitute characters may be narrowed down to a smaller subset by a partial recognition component, so each of the entire set of possible characters does not have to be considered for possible substitutes. One of ordinary skill will recognize that the invention is not limited to characters in the Latin alphabet or Arabic number system, but includes other types of characters as well, such as the characters from other alphabets and number systems, for example, Cyrillic alphabet characters and numbers.

The system next compares each trigraph from the permutations formed with substitution characters to a set of reference trigraphs for each category, in this case left, middle, and right categories (stages 130, 145, and 160), and forms a set of possible trigraphs for each category comprising the substitution trigraphs from the set of permutations that match a trigraph in the reference set (stages 135, 150, and 165). In one embodiment consistent with the invention, the reference set of trigraphs comprises trigraphs that are known to be correct for a given type of read-in character string and the category being analyzed. For example, if the character string read by the OCR system is known to be a word, then the reference sets would not contain trigraphs containing numbers. Further, if the read character string is known to be an English word, then the reference sets would not include trigraphs that do not occur in English, such as "ggg." Or, if the read character string was known to be a U.S. telephone number starting with an area code, then the reference set for the left trigraph category would comprise a list of valid U.S. area codes.

Some embodiments consistent with the invention use an xgraph size parameter other than three-character trigraphs and/or different, more than, or fewer than three xgraph location categories to divide and categorize an ambiguous character string for resolution processing. The exact xgraph size and categories used are not critical to the invention, though each combination may involve processing time and/or memory space tradeoffs.

One of ordinary skill will recognize that although the left, middle, and right category operations (stages 125-165) are illustrated as being performed in parallel in FIG. 1A, they could be performed in series, or in other parallel configurations, without departing from the principles of the invention.

After the possible trigraphs formed by character substitution are narrowed down to a set of possible trigraphs for each category, the system combines the sets of possible trigraphs according to category and position, forming a list of potentially correct strings that might be the correct interpretation or resolution of the ambiguous character string read by the system (stage 170).

Next, similar to the trigraph category processing explained above, the system compares the set of potential strings to a reference set of strings, producing a set of valid strings that match a string from the reference set (stage 175). In one embodiment consistent with the invention, the reference set of strings comprises strings that are known to be correct for the type of character string read by the system from an object. For example, if the character string read by the OCR system is known to be an English word, then the reference set of strings could contain all the words in a specific English dictionary. Or, if the read character string is known to be family name in a certain country, county, city, etc. (such as the last name of the addressee on an item being delivered to a house in the United States,) then the reference set of strings could contain the most common family names in that country, county, or city, etc. Or, to expand on a previous example, if the read character string is known to be a job title because it corresponds to the word entered into the "position applying for" space in an employment application, then the reference set of strings could contain valid job title strings.

In the embodiment shown, from the set of valid strings, each of which are the same as a string from the reference set, the system chooses the "best" string as the output interpretation of the read-in character string (stage 180). In some embodiments consistent with the invention, if only one potential string emerges from the comparison (i.e. the set of valid strings contains one member), such as "secretary" 185 for the ambiguous job title example as shown in FIG. 1D, then that string is output as the system's interpretation of the ambiguous read-in character string. In one embodiment consistent with the invention, the strings in the reference set are ranked in order of probability of being correct, and the system chooses the highest ranked valid string as the "best" string, i.e., the string determined most likely to be the correct interpretation of the read-in ambiguous character string. For example, if stage 175 narrows down the list of potentially correct strings to "hardware" and "firmware" for an engineering job position title, then "hardware" may be ranked as more likely in a company that employs, or seeks to hire, many hardware engineers but very few firmware engineers.

In another embodiment consistent with the invention, the system may choose the best string by using information about the context of the read-in ambiguous character string, for example, by analyzing the list of potentially correct strings in connection with other information, such as other character strings read by the OCR system or information related to the type of character strings read by the OCR system. For example, for an ambiguous character string for a name of the addressee on a delivery item, the names in the list of potentially correct strings may be cross referenced with the street address on the item, and the system may choose as the best matching string the name from the set of potential strings that corresponds to the name associated with the street address. As another example, for an ambiguous telephone number string, the system may cross reference the list of potentially correct telephone number strings with an area code successfully recognized by the system and choose as the best match a number from the list of potentially matching strings that corresponds to a working telephone from that area code. As another example, for a word in a document, the system may determine whether the word preceding the ambiguous word is a transitive verb or an article, and if so, cross reference the list of potentially correct word strings with a list of noun words (a noun typically follows a transitive verb or an article) and choose as the best matching string(s) the most common noun (s) used in documents addressing similar subject matter, or a noun that has appeared previously in the current document.

One of ordinary skill will recognize that the exemplary process shown in FIG. 1A is simplified for clarity of illustration, and that stages may be added, deleted, or modified without departing from the scope of the invention. For example, one or more stages may be added to bypass the category-narrowing stages, such as stages 155, 160, and 165, if one or more of the categories did not contain an ambiguous character, such as, if the right trigraph did not contain any ambiguous characters. For another example, stages may be added to handle the occurrence of no matches when the trigraph permutations or list of potentially correct strings is compared to the reference trigraphs or reference set of strings. For another example, stages may be added to perform further cross checking with other information to determine the best matching string for output. As yet another example, stages may be added to bypass stage 180 if only one potential string matches the reference set of strings in stage 175.

Figure 2A:
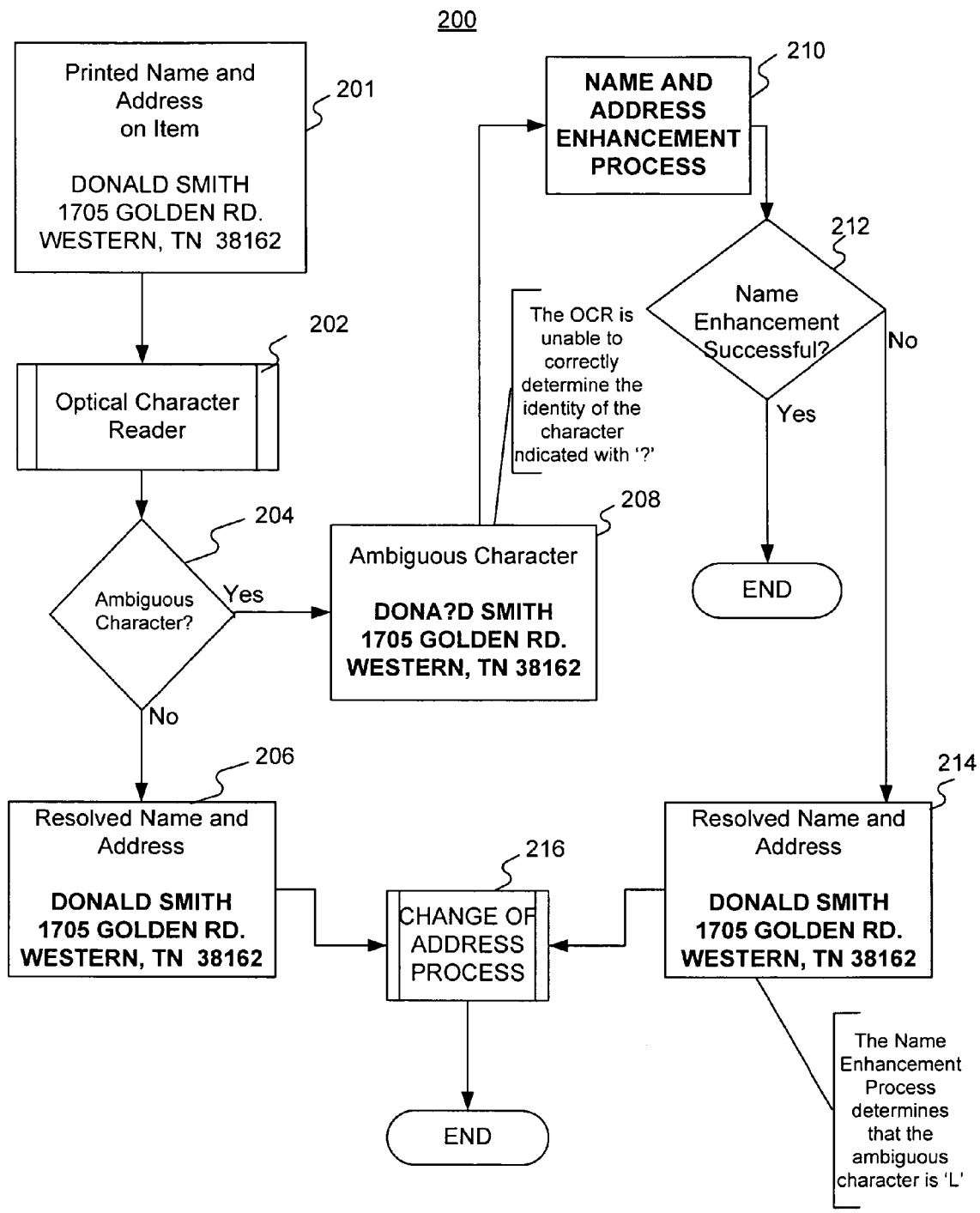
FIG. 2A is an exemplary diagram of a system used to interpret addresses on an item for delivery, consistent with the invention.

FIG. 2A is an exemplary diagram of a system 200 used to interpret addresses on an item for delivery, such as a package or piece of mail. To begin, an item for delivery, such as a letter 201 with the name "Donald Smith" and the delivery address "1705 Golden Rd. Western, Tenn. 38162," enters a system for sorting or otherwise processing delivery items. In the system, an optical character reader 202 identifies the address on the delivery item and obtains a digital image of the characters that make up the name and address on the item.

A processor and software (not shown) or dedicated circuit (not shown) connected to the reader optics tries to read or interpret the digital image of the name and address (block 204). If the name is clearly printed or typewritten, then the system typically resolves each character into a letter, number, or punctuation mark without ambiguity (block 204, No), translating the shapes of the characters of the name and address image into the letters and numbers of the name and address on the item (block 206). This name and address data is then submitted to a change of address (COA) process (block 216), which may update the address for the item to a forwarding address if the addressee has moved and filed a COA order, as is known in the art.

If, on the other hand, the system cannot resolve one or more characters in the address because one or more characters are ambiguous, which most frequently occurs with hand-addressed items (block 204, Yes), then the system denotes the ambiguous character(s), for example by placing a symbol, such as a question mark, in its place, and performs further character string resolution processing (block 208). In the example shown in FIG. 2A, the next to last character in the first name is ambiguous, and the system has replaced the ambiguous character with a question mark, "Dona?d."

The system then begins a name enhancement process to resolve the ambiguous character(s) (block 210). In one embodiment, the name enhancement process is a customized variation of the process illustrated in FIG. 1A.

If the name enhancement process (block 210) successfully enhances the name by determining a replacement for the ambiguous character(s) with a predetermined minimum (typically high, for example 90%), degree of certainty (block 212, Yes), then the ambiguous character is replaced with the replacement character and output as the resolved name and address for the item (block 214). As shown, the ambiguous character in "Dona?d" is replaced with an "l" to produce "Donald" as the resolved name. In the embodiment shown, this name and address data is then submitted to a change of address process (block 216), which may update the address for the item to a forwarding address if the addressee has moved and filed a COA form. Based on the address read from the delivery item, or an updated address determined by the change of address process, the item may be marked for automated sorting and delivery.

If, on the other hand, the name enhancement process is not successful (block 212, No), then the ambiguous character(s) cannot be resolved with a satisfactory degree of certainty, and the name on the item may be determined in other ways, such as, by human visual inspection.

One of ordinary skill will recognize that a similar process may be applied to any character strings read from a delivery item, such as a last name, a street number, a street name, a town name, a state name or abbreviation, or a ZIP CODE™ delivery code.

Figure 2B:
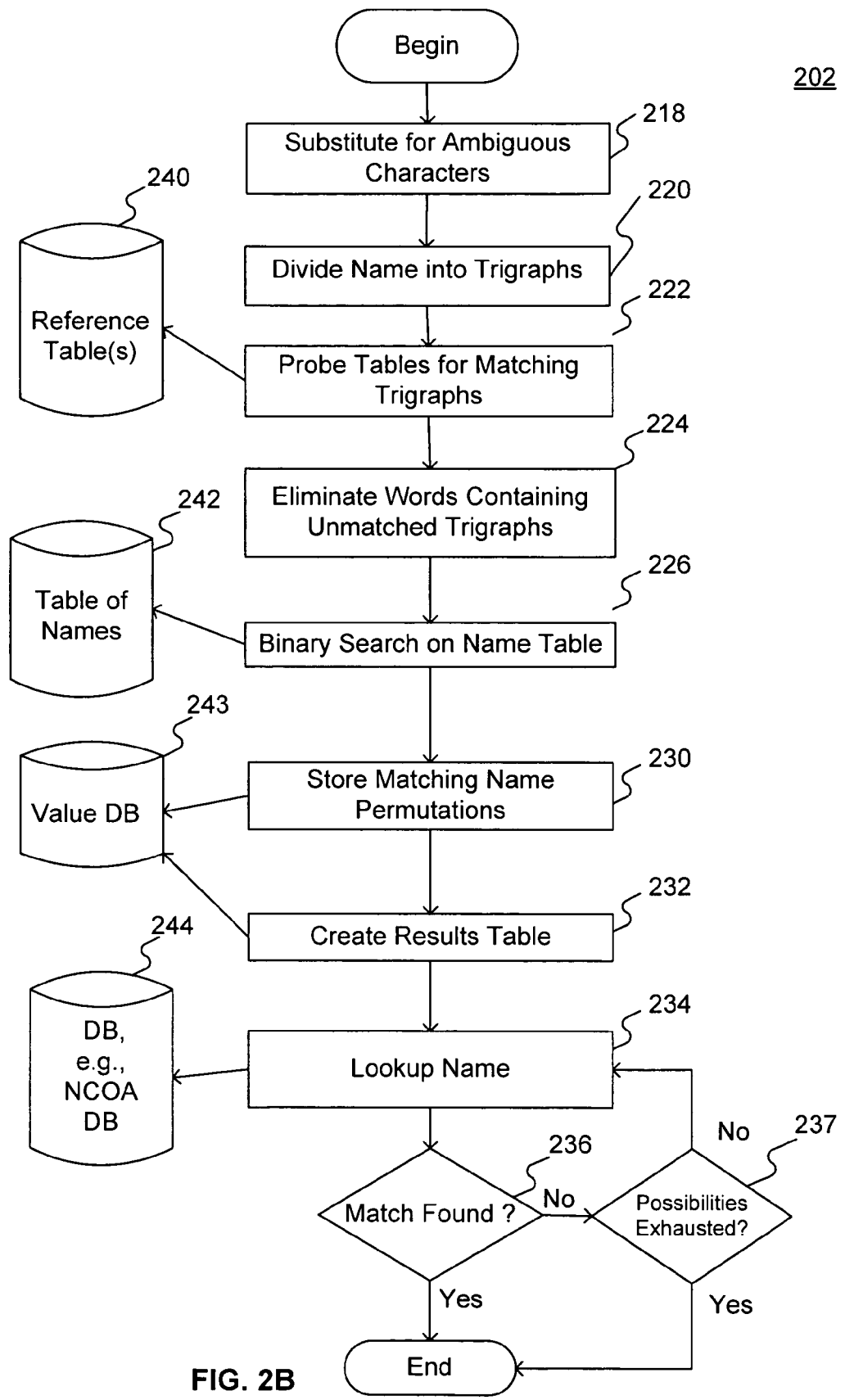
FIG. 2B is an flow diagram of an exemplary procedure for determining an ambiguous character, consistent with the invention.

FIG. 2B is an flow diagram of an exemplary procedure 202 for determining an ambiguous character, consistent with the invention. In one embodiment, name enhancement process 210 of FIG. 2A includes procedure 202, and procedure 202 is performed by one or more data processing systems executing appropriate software.

In general, an ambiguous character may be a letter, number, punctuation mark, musical note, or other symbol. In the particular example illustrated in FIG. 2B, however, the procedure is specifically designed to resolve ambiguities in a character string that is a name, and an ambiguous character in a name will be a letter.

Consider, for example, an item addressed for delivery, such as a package. In one embodiment consistent with the invention, an OCR system reading the address label on the package assumes that the first or topmost line of characters is the name of the intended recipient. Further, in this embodiment, the OCR system assumes that the first word of the first line (e.g., the first string of characters before a blank space on the first line) is a first name, and that the last word of the first line is a last name or family name.

Figure 3:
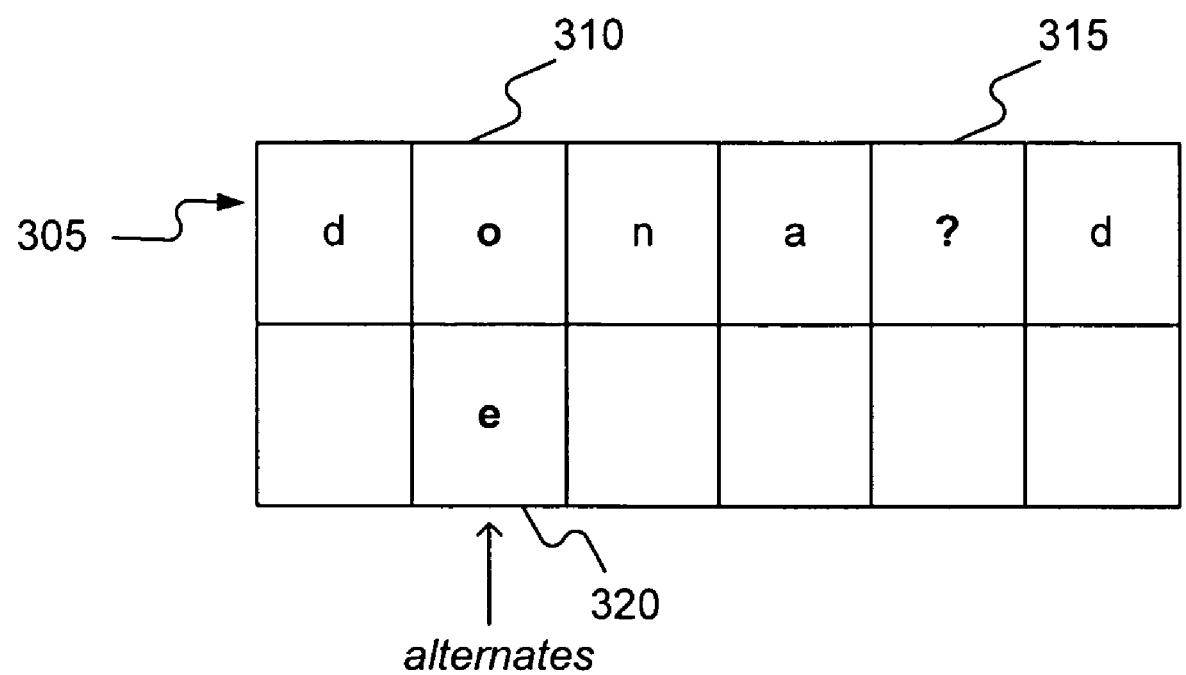
FIG. 3 is a representative example of an OCR-read character string with two ambiguous characters.

Refer for a moment to the exemplary OCR-read character string shown in FIG. 3, which represents the first word 305 scanned by an OCR system from the first line of a delivery address (typically the recipient's first name), containing two ambiguous characters that the system cannot resolve with the required certainty. In this example, an OCR reader has determined with some certainty that the second character of the word is either the letter "o" 310 or the letter "e" 320, represented by the alternates shown in FIG. 3. In this example, the OCR reader cannot, however, narrow down the ambiguous fifth character 315 at all, and so it is represented by a question mark.

Referring again to FIG. 2B, procedure 202 begins by substituting replacement characters for the ambiguous characters in the character string read by the OCR system (stage 218). This creates a set of possible permutations for the character string. To continue with the example from FIG. 3, refer now to FIG. 4A, which illustrates a set of 52 name permutations 400 that results from substituting each possible alternate character (in this case, letters of the alphabet) for each ambiguous character in the character string. In the case of the second letter of the name string 305 from FIG. 3, the possible substitute letters are just "o" 310 and "e" 320 because the OCR reader has narrowed it down to these two choices as shown in FIG. 3. In the case of the fifth letter 315 of the name string 305, the possible substitute letters are all the letters in the alphabet, "a" through "z." For ease of illustration, set 400 is shown in two columns. A first column 410 shows the 26 permutations possible when "o" is substituted for the second letter, and a second column 415 shows the 26 permutations possible when "e" is substituted for the second letter.

In some embodiments consistent with the invention, a system will not attempt to resolve character strings with more than a preset maximum number of ambiguous characters, such as three ambiguous characters, because as the number of ambiguous characters increases, so does the amount of time and processing it takes to resolve the character string. In some applications, such as determining the correct addressee name in an item delivery processing system, OCR word or string recognition must be completed within a specified time period. In many embodiments, a certain minimum solution speed is needed to avoid delaying upstream processes and starving downstream processes, and any benefit of processing more than a threshold number of ambiguous characters is outweighed by the extra time lost to do so. One of ordinary skill will recognize that this condition may change as processors and data storage devices become faster, or as embodiments are designed that use different data access architectures, or as alternative resolution processing, such as human resolution, becomes faster. In one embodiment, items having character strings with ambiguous characters exceeding a preset threshold may be directed to a slower speed track where extended character string resolution processing will not affect upstream and downstream processes.

Referring again to FIG. 2B, procedure 202 divides the string of characters from each of the possible permutations into smaller sets of characters, i.e., xgraphs, such as three-character trigraphs (stage 220). For example, the procedure breaks the first permutation of the word in column 410 of FIG. 4A, "donaad," into the following trigraphs: "don," "ona," "naa," and "aad." As noted above, the size of the xgraphs may be two, four, or more characters, and the size may be dynamically variable, so three-character trigraphs are but one possibility. Character strings having the same number of or fewer characters than the xgraph size need no processing in this stage.

In one embodiment consistent with the invention, the system classifies each xgraph according to its position in the character string. For example, each trigraph may be placed in one of three categories: the first three (leftmost) characters, the last three (rightmost) characters, and the middle three characters. In one embodiment, as shown in FIG. 4B, multiple middle trigraphs may be formed from each character sequence beginning with second character 435, then third character 440, then fourth character 445, etc. until the last trigraph is formed 455 that does not duplicate the rightmost trigraph. In another embodiment, a single non-overlapping middle xgraph, such as trigraph 430, may be used.

In some embodiments consistent with the invention, the xgraphs are categorized based on factors other than their position in the character string. For example, they may be categorized based on position relative to a certain "indicator" character or characters, such as the four-character quadgraph that follows a hyphen character (e.g., at the end of a social security number), all the characters in a string that precede a "/" character (e.g., the month in birth date), or the five character quintgraph consisting of the two characters that precede an "x," the "x," and the two characters that follow the "x" in an application where "x" marks a meaningful data element or field. In some embodiments, categories are designed to correspond to reference table requirements, as described below.

Referring again to the embodiment shown in FIG. 2B, after the string is divided into trigraphs, the procedure probes a reference table(s) of trigraphs 240 for matching trigraphs in each category (stage 222). To continue with the example of FIGS. 3 and 4A, the procedure probes reference table(s) 240 to determine whether it contains the trigraphs "don," "ona," "naa," and "aad." More specifically, in an embodiment that employs left, middle, and right trigraph categories, the system probes a left reference table for the leftmost "don" trigraph, probes a right reference table for the rightmost "aad" trigraph, and probes a middle reference table for the remaining two trigraphs to determine whether there are matching reference trigraphs stored in the tables.

In one embodiment consistent with the invention, reference table(s) 240 contain a set of valid xgraphs customized for the OCR application, such as an application for reading the first name of the intended recipient of an item for delivery, reading the last name of the intended recipient of an item for delivery, reading a social security number, reading a job title, reading a date, reading a street address, reading a word in a business document, etc. In one embodiment, as noted above, the valid reference xgraphs are organized by category in the reference tables (e.g., leftmost, middle, and rightmost; the xgraph preceding a slash character, the xgraph after a slash character, etc.).

Reference table(s) 240 may be populated in many ways consistent with the invention. For example, in an OCR application for reading social security numbers, a "before the first hyphen" reference table may be populated with all the valid three digit trigraph combinations that can start a social security number, a "between the hyphens" reference table may be populated with all the valid two digit combinations that can appear in the middle of a social security number, and an "after the second hyphen" reference table may be populated with all the valid four digit combinations that can appear at the end of a social security number. Furthermore, the choice of valid reference tables or strings may be further narrowed or defined by the context of the read-in character string that the system is resolving. To continue the previous example, the "before the hyphen" reference table may be partioned by issue date, such that only three number combinations for the beginning of social security numbers issued during the period surrounding an applicant's birthdate are valid. For another example, reference table(s) 240 may contain a set of valid three-letter combinations that can begin a first name, end a first name, and occur in the middle of a first name if the context of the string being resolved indicates that the string is a first name. Similarly, reference tables 240 may contain a set of valid three-letter combinations that can begin a last name, end a last name, and occur in the middle of a last name. One way to obtain sets of valid three-letter combinations for reference table(s) 240 that relate to names is to harvest them from an existing data source of names, preferably one associated with the intended application of the OCR system. Examples of such data sources include phone books, online telephone directories, mailing lists, and the U.S. Postal Service's National Change of Address (NCOA) database.

As shown in FIG. 2B, in an exemplary OCR system for reading the names of intended recipients of delivery items, reference tables 240 may contain the most common name trigraphs appearing in the NCOA database, categorized by position (leftmost, middle, and rightmost). In this embodiment, a first reference table contains trigraphs taken from the leftmost part of the names contained in the NCOA database. A second reference table contains trigraphs taken from the rightmost part of the names contained in the NCOA database. And, a third table contains trigraphs extracted from the middle sections of the names contained in the NCOA database. For other embodiments consistent with the invention, similar reference tables may be built from data sources that contain, or from which can be derived, a set of xgraph character strings that can be used as references for the particular type of character string that an OCR application is designed to read. Examples include words from a dictionary categorized by type (noun, verb, preposition, etc.), social security number parts categorized by issue date and/ort issue place, credit card numbers categorized by card type and/or issue date, etc.

Probing trigraph reference table(s) 240 for matching trigraphs (stage 222) produces a set of possible trigraphs. FIG. 5 illustrates an exemplary result of probing reference tables 240 for the trigraphs for the first permutation "donaad" for the read in character string from the examples of FIGS. 3 and 4A. As shown, the first column 505 lists the trigraphs from the "donaad" example: "don" 520, "aad" 525, "ona" 530, and "naa" 535. The second column 510 lists the corresponding reference table that was probed to determine whether there was a matching reference trigraph. As shown, the system referred to the "left" reference table for the characters "don" 520, which start the permutation "donaad;" the system referred to the "right" reference table for the characters "aad" 525, which end the permutation "donaad;" and the system referred to the "middle" reference table for the characters "ona" and "naa." The third column 515 shows whether a match was found when a reference table was probed. As shown, the system found matches, indicated by "Y," for all of the three-character strings 520, 525, 530, and 535, indicating that they are possibly trigraphs that will correctly resolve the ambiguity in the read-in character string.

Figure 4A:
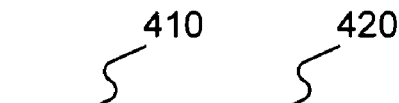
FIG. 4A is an exemplary list of 52 name permutations that could result from substituting a set of possible characters for each ambiguous character in a character string, such as the character string of FIG. 3.
Figures 4B, 5:
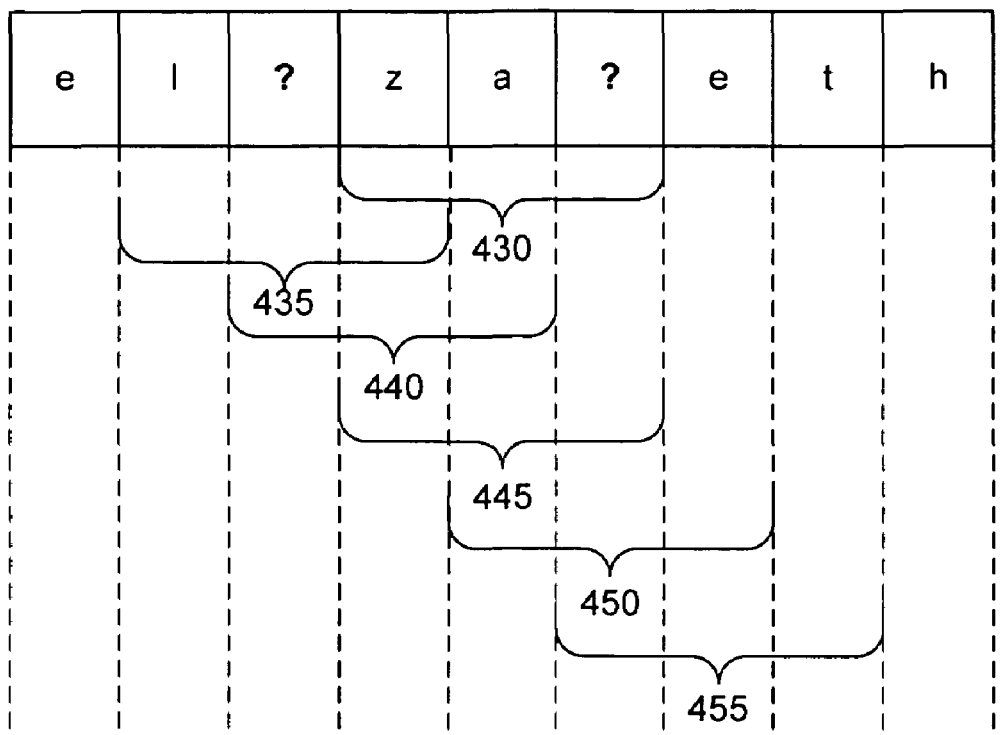
FIG. 4B is a diagram illustrating an exemplary division of an ambiguous character string into trigraphs.
FIG. 5 illustrates an exemplary result of probing a reference table for xgraphs that match the xgraphs in a candidate character string permutation.

Similar to FIG. 5, FIG. 6 illustrates an exemplary result of probing reference tables 240 for the trigraphs for the second word permutation "donabd" from the examples of FIGS. 3 and 4A. As shown, the first column 605 lists the trigraphs from the example: "don" 620, "abd" 625, "ona" 630, and "nab" 635. The second column 610 lists the corresponding reference table that was probed to determine whether there was a matching reference character string. As shown, the system referred to the "left" reference table for the characters "don" 620, which start the permutation "donabd;" the system referred to the "right" reference table for the characters "abd" 625, which end this permutation; and the system referred to the "middle" reference table for the characters "ona" and "nab." The third column 615 shows whether a match was found when a reference table was probed. As shown, the system found matches, indicated by "Y," for the possible three-character strings "don" 620, "ona" 625, and "nab" 635. For "abd" 625, however, the system did not find a match in the reference table, indicated by "N" 640 in third column 615. Thus, "abd" is not a possible solution trigraph for the "right" category of trigraphs. In the case of words, whether in English or another language, this matching operation may be thought of, or labeled, as identifying trigraphs that are "pronounceable" in the word-position category being considered. Here, the three-letter string "abd" may be thought of as being unpronounceable when it occurs at the end of a word, i.e., in the rightmost category. Note that the same string, however, may be considered pronounceable (i.e., possibly correct) in another position in the word, such as the middle. Regardless of label applied to this process, an "N" result in match column 615 indicates that this permutation of the read-in character string is not valid in the reference table's context. In this case the "N" indicates that "donabd," and other permutations ending in "abd," are not a possible valid resolution of the ambiguous character string.

Referring again to FIG. 2B, after consulting reference tables 240, the system eliminates from further consideration word permutations that contain trigraphs not found in reference table(s) 240 (stage 224). For example, referring to FIG. 4A, the system will eliminate "donabd" and "denabd" from consideration as possible correct resolutions of the ambiguous name because these permutations contain the unmatched xgraph string "abd" as their last three letters. Thus, the list of permutations culled from the set of permutations 400 that will be considered as potentially correct solution strings is greatly reduced, which speeds up subsequent processes that analyze the list of potentially correct solution strings.

As shown in FIG. 2B, the system next compares the reduced list of potentially correct strings to a reference set of possible solution strings, which in this embodiment is a reference table of names 242 (stage 226). This comparison may be done, for example, using a binary search. Name reference table 242 contains a set of valid names for the entire character string read by the OCR system. In one embodiment, table of names 242 contains names that appear in a NCOA database 244, such as, for example, a subset comprising all the names that appear at least one hundred times in NCOA database 244, or all the names that make up at least 0.5% of all the names in the database, or all the names that meet some other criteria. As noted above, NCOA database 244 consists of change-of-address records for customers who have submitted a change-of-address request to the U.S. Postal Service during the last four years. In one embodiment, each of the names in table of names 242 has a corresponding statistical value calculated from data about similar character strings, for example, the number of occurrences of a certain first name or last name in NCOA database 244, or some other data related to the likelihood that the name is the correct resolution of the ambiguous name character string read by an OCR system.

In other embodiments consistent with the invention, table 242 may contain a set of valid character strings that are possible correct solutions related to the application the OCR system is designed for. For example, if the OCR system is designed to read a social security number, table 242 may contain a set of valid social security numbers. Or, if the OCR system is designed to read the occupation field of an employment application form, table 242 may contain a set of valid job titles. Or, if the OCR system is designed to read a business document, table 242 may contain valid English words, such as the words from a dictionary.

Next in FIG. 2B, the set of valid string(s) that match a name in table of names 242 are stored in value database 243 (stage 230). In one embodiment, a valid name string is stored in value database 243 with corresponding information related to the likelihood that it is the correct resolution of the ambiguous name, which may be derived by analysis of the source of the valid character strings. Alternatively, the matching valid name strings may be held in memory.

For example, as shown in FIG. 7, procedure 202 may create and utilize a data structure 700 containing each valid name string 705 that matches an entry in table of names 242 and a corresponding value 710 that represents the statistical number of occurrences of that name in a database 244, such as the NCOA database. Here, row 715 shows "donaid" occurred 1,244 times in the NCOA database, row 720 shows "donald" occurred 366,298 times in the NCOA database, and row 730 shows "donard" occurred 211 times in the NCOA database. In this example, permutations such as "donaad" and "denaod" did not appear in table of name, 242, so the system eliminates them from consideration, narrowing the starting set of 52 name permutations 400 of FIG. 4A down to the set of three valid name strings 705 of FIG. 7. In one embodiment, the statistics regarding the likelihood of a character string being a correct interpretation are updated periodically, so that the most likely correct solution for a particular ambiguous string may change over time. For example, as a new first name gains popularity and starts appearing in the NCOA database, it may become a likely solution to an ambiguous character string for which it previously would not have been considered a solution, such as "Madison," which was extremely uncommon as a first name prior to the 1980s.

For documents that are being read with an OCR system, an example of information related to the likelihood that a possible valid solution string is the correct resolution of the ambiguous read-in character string is word type and word position in a sentence. For example, a verb is more likely to be the third word of a sentence than is a noun. Thus, if the ambiguous string "pe?rs" from a document results in the possible valid solution strings "peers" and "pears, and the ambiguous string is the third word in a sentence, the system will denote "peers" as the most likely correct resolution of the ambiguous word. Similarly, an article or a noun is more likely to be the first word of a sentence than is a verb, and a preposition is least likely to be the last word of a sentence. Accordingly, in one embodiment consistent with the invention, each possible valid solution string is classified as to its word type (e.g., noun, verb, preposition, article, etc.), and a probability of correctness assigned to it based on its absolute position in the sentence (e.g., first word in sentence, second word in sentence, last word in sentence, etc.).

In another embodiment, each possible valid solution string is classified as to its word type (e.g., noun, verb, preposition, article, etc.), and a likelihood of correctness assigned to it based on its position relative to other known words in the sentence (e.g., a noun is more likely to follow an article than is a verb, a verb is more likely to follow a noun than is an article, etc.). Thus, if the ambiguous string "pe?rs" from a document results in the possible valid solution strings "peers" and "pears, and the ambiguous string follows the word "the," which is an article, in the sentence, then the system will denote "pears" as the most likely correct resolution of the ambiguous word. Such embodiments may be useful in environments where speediness of resolution speed is not critical, such as converting paper documents into word processing files for a business.

Figure 8:
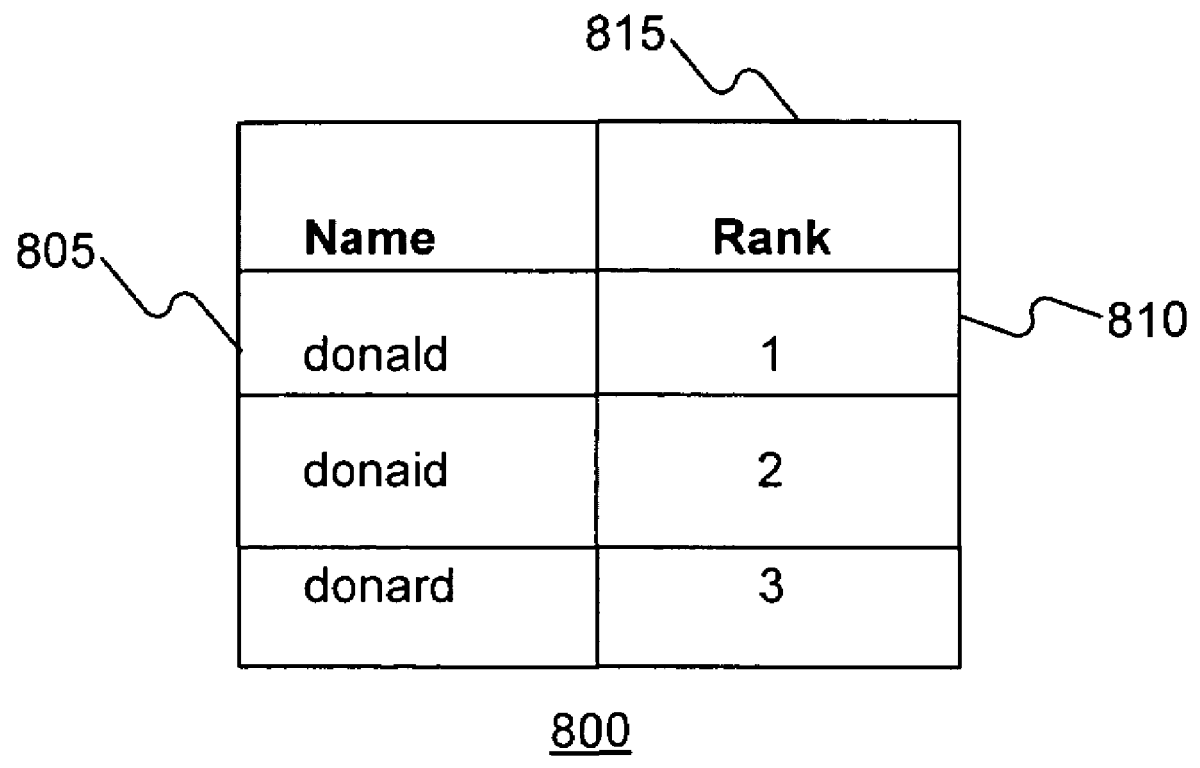

Next, in FIG. 2B, procedure 202 creates a results table (step 232), which may also be stored in the value database 243. Alternatively, the results table may be saved in a separate database or just held in memory. FIG. 8 is an exemplary results table 800 showing the three valid name strings placed into a ranking order based on frequency of occurrence, as explained above. As shown in FIG. 7, the name Donald has the highest number of occurrences in the NCOA database 244, and therefore, as shown in FIG. 8, it is assigned a frequency ranking of one 810. Although only three names are shown in this example, embodiments consistent with the invention may use some limit on the size of table 800, such as the top ten most frequently occurring valid permutations. In other embodiments consistent with the invention, as noted above, valid character string permutations may be ranked by other criteria, such as the likelihood that a string is a known street name, the commonness of a word or number, or the probability that a given character string is desired or correct in the context of a given OCR application. As shown, the character string "donald" 805 is ranked first 810 because it is occurs more often than the other two strings as a first name in the NCOA database.

In one embodiment consistent with the invention, procedure 202 presents the highest ranking valid string as its resolution of the ambiguous character string. In another embodiment, procedure 202 uses the rank 815 to dictate the order of presentation of each possible solution string to a final resolution determination procedure. For example, in the procedure shown in FIG. 2B, the possible solution strings are presented in the order specified in the results table 800 to an NCOA lookup procedure that attempts to match the string to a name in the NCOA database (stage 234). As shown in FIG. 8, "donald" is considered the most likely resolution of the ambiguous string "d(o/e)na?d," and is thus the first name presented for lookup (along with an unambiguous last name) to the NCOA database 244.

As shown in FIG. 2B, if a match is not found (for example if no match is obtained using the name "donald"), then the lookup repeats (for example, using the second highest ranked name, and therefore the second most likely spelling, "donaid") until a match is found (stage, 236, Yes), or all the strings in results table 800 have been exhausted (stage 237, Yes).

As noted above, procedure 202 may be related to the system of FIG. 2A. For example, if Donald Smith had filed a change of address from 1705 Golden Rd., Western, Tenn. 38152, and the delivery-item-processing OCR resolved the characters of the first name down to the three permutations shown in FIGS. 7 and 8 (assuming that the last name 'Smith' was interpreted without ambiguity), the system would probe the NCOA database 244 to determine if it contained a match for "Donald Smith" at 1705 Golden Rd. in Western, Tenn. If no such match was found, the system would attempt to match "Donaid Smith" and "Donard Smith" at that address.

One of ordinary skill in the art will recognize that stages may be added to, removed from, or modified in the procedure shown in FIG. 2B without departing from the principles of the invention. For example, a similar procedure could be applied to a street address character-reading ambiguity, a city-state ambiguity, or a ZIP CODE™ delivery code ambiguity. Or, a similar procedure could be applied by systems that read things other than names and addresses on delivery items, such as systems that read forms or documents, systems that read items being inventoried, systems that read price tags on items being sold, systems that read sheet music, etc.

One of ordinary skill will also recognize that although the exemplary procedure of FIG. 2B is reading letters, and although the word "trigraph" literally means three letters, the inventive concepts apply to numbers, symbols, and other types of characters as well. Further, as mentioned above, although the exemplary embodiments use three-character groupings, two-character, four-character, or larger groupings could be used as well without departing from the principles of the invention.

One of ordinary skill will also recognize that for clarity of explanation, names have not been capitalized in the examples of FIGS. 3-8. Other embodiments consistent with the invention may use capitalization or ignore it.

Figure 9:
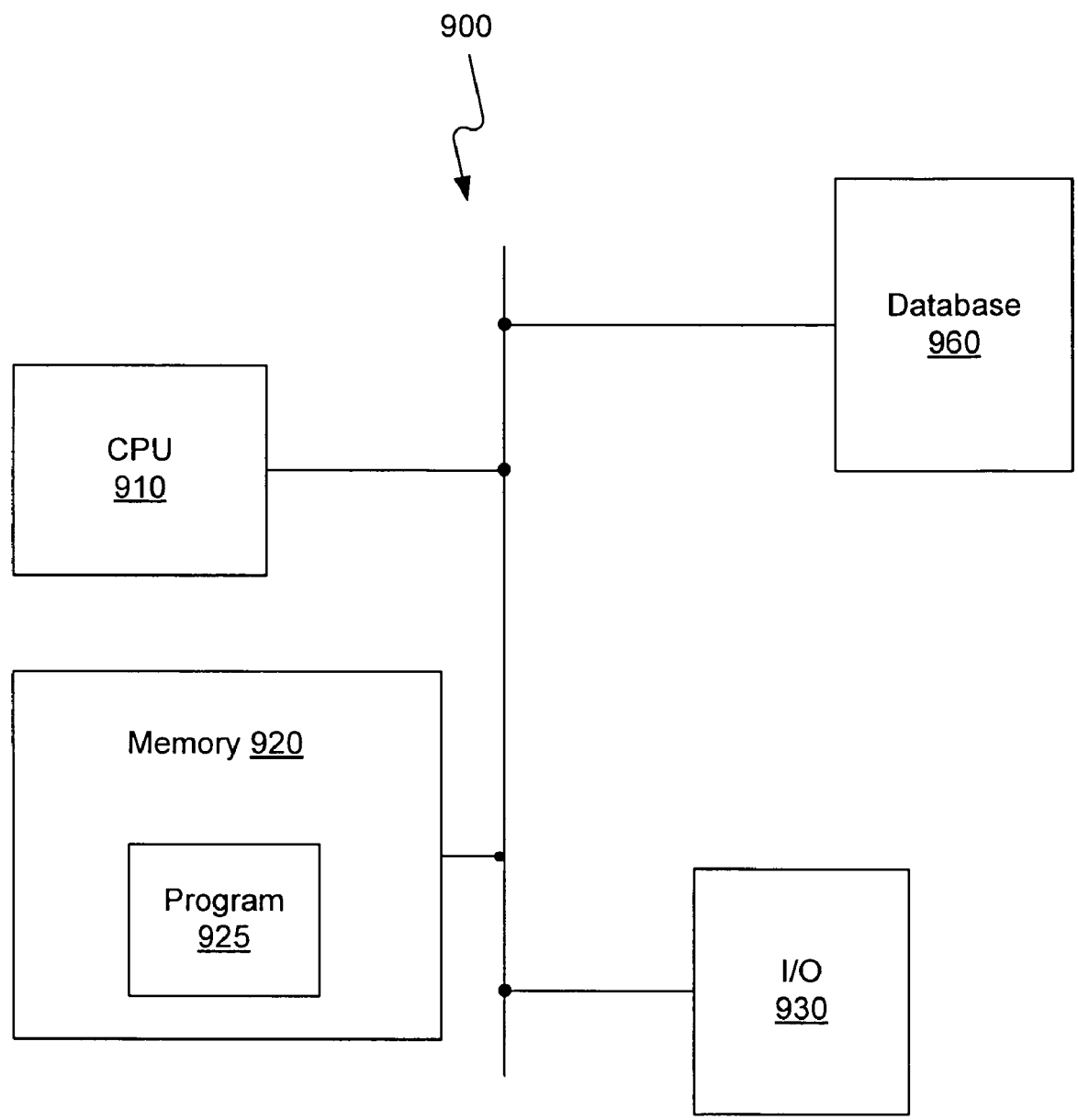
FIG. 9 illustrates an exemplary computing system that may be used to implement embodiments of the invention.

FIG. 9 illustrates an exemplary computing system 900 that may be used to implement embodiments of the invention. The components and arrangement, however, are not critical to the present invention.

Computing system 900 includes a number of components, such as a central processing unit (CPU) 910, a memory 920, an input/output (I/O) device(s) 930, and a database 960. System 900 that can be implemented in various ways. For example, an integrated platform (such as a workstation, personal computer, laptop, etc.) may comprise CPU 910, memory 920 and I/O devices 930. In such a configuration, components 910, 920, and 930 may connect through a local bus interface and have access to database 960 (implemented as a separate database system). This access may be implemented through a direct communication link, a local area network (LAN), a wide area network (WAN) and/or other suitable connections. System 900 may be part of a larger OCR system, which may, in turn, be part of a larger system, such a sorting system, inventory system, or document processing system.

CPU 910 may be one or more known processing devices, such as a microprocessor from the Pentium™ family manufactured by Intel™. Memory 920 may be one or more storage devices configured to store information used by CPU 910 to perform certain functions related to embodiments of the present invention. Memory 920 may be a volatile or non-volatile, magnetic, semiconductor, tape, optical, or other type of storage device. In one embodiment consistent with the invention, memory 920 includes one or more programs 925 that, when executed by CPU 910, perform various procedures consistent with the present invention. For example, memory 920 may include a character string enhancement program 925 that determines words, such as the intended recipient's name, on an item to be delivered, or memory 920 may include a comparison program 925 that determines whether a character string permutation matches a reference string, or memory 920 may include an analysis program 925 that analyzes a database of reference xgraphs and determines a set of valid or pronounceable xgraphs for various categories of positions in a character string. Memory 920 may also include other programs that perform other functions, such as programs that control the gates and belts of a high-speed sorting machine.

Methods, systems, and articles of manufacture consistent with the present invention are not limited to programs or computers configured to perform dedicated tasks. For example, memory 920 may be configured with a program 925 that performs several functions when executed by CPU 910. That is, memory 920 may include a program 925 that performs character recognition functions, character substitution functions, character string matching functions, and machine control functions. Alternatively, CPU 910 may execute one or more programs located remotely from system 900. For example, system 900 may access one or more remote programs that, when executed, perform functions related to embodiments of the present invention.

Memory 920 may be also be configured with an operating system (not shown) that performs several functions well known in the art when executed by CPU 910. By way of example, the operating system may be Microsoft Windows™, Unix™, Linux™, an Apple Computers operating system, Personal Digital Assistant operating system such as Microsoft CE™, or other operating system. The choice of operating system, and even to the use of an operating system, is not critical to the invention.

I/O device(s) 930 may comprise one or more input/output devices that allow data to be received and/or transmitted by system 900. For example, I/O device 930 may include one or more input devices, such as a keyboard, touch screen, mouse, and the like, that enable data to be input from a user. Further, I/O device 930 may include one or more output devices, such as a display screen, CRT monitor, LCD monitor, plasma display, printer, speaker devices, and the like, that enable data to be output or presented to a user. I/O device 930 may also include one or more digital and/or analog communication input/output devices that allow computing system 900 to communicate with other machines and devices. The configuration and number of input and/or output devices incorporated in I/O device 930 are not critical to the invention.

Database 960 may comprise one or more databases that store information and are accessed and/or managed through system 900. By way of example, database 960 may be an Oracle™ database, a Sybase™ database, or other relational database. Database 960 may be, for example, xgraph reference tables, tables of valid character strings, databases of correct solution likelihood information, the National Change of Address database or a copy or abstract thereof, etc. Systems and methods of the present invention, however, are not limited to separate databases or even to the use of a database, as data can come from practically any source, such as the internet and other organized collections of data.

In one embodiment consistent with the invention, programs 925 are loaded into memory 920, for example through I/O interface 930, from a computer readable medium (not shown) that stores programs 925, such as a magnetic disk, optical disk, solid state memory (e.g., various types of ROM and erasable ROM), magnetic tape, etc. The computer readable medium may includes one or more programs 925 or applications that, when executed by system 900, perform processes and methods consistent with the present invention, such as a character string enhancement application that resolves ambiguous words, such as the intended recipient's name, on an item to be delivered, a comparison application that determines whether a character string permutation matches a reference character string, an analysis application that analyzes a database of reference xgraphs and determines a set of valid or pronounceable xgraphs for various categories of positions in a character string, or an application that controls the gates and belts of a high-speed sorting machine in conjunction with the result of an attempt to read a character string from an item being sorted using an OCR subsystem.

The preceding descriptions are examples of embodiments of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for resolving an ambiguous character in a character string read by an OCR system, comprising:

forming string permutations of the character string by substituting a plurality of replacement characters for the ambiguous character;

deriving xgraphs from the string permutations, wherein deriving xgraphs comprises:

dividing a string permutation into a set of multicharacter strings, each multicharacter string having a position in the string permutation; and categorizing the multicharacter strings according to position in the string permutation;

matching the xgraphs with a reference set of valid xgraphs corresponding to the positions of the xgraphs in the string permutation;

creating solution permutations by removing from the string permutations any string permutation containing an xgraph that does not match a valid xgraph in the reference set; and outputting the solution permutations.

2. The method of claim 1, further comprising:

ranking the solution permutations by likelihood of being a correct interpretation of the character string.

3. The method of claim 2, wherein ranking further comprises:
determining the likelihood based on the context of the character string in relation to another character string read by the OCT system.

4. The method of claim 2, wherein ranking further comprises:
determining the likelihood based on a predetermined statistic from a plurality of character strings corresponding to the character string read by the OCR system.

5. The method of claim 4, wherein the predetermined statistic is frequency of occurrence.

6. The method of claim 1, wherein the xgraph is one of a group comprising: a group of two characters, a group of three characters, a group of four characters, and a group of five characters.

7. The method of claim 1, wherein the position is one of a group comprising: a leftmost position, a middle position, and a rightmost position.

8. The method of claim 1, further comprising:
deriving a plurality of valid xgraphs from a plurality of character strings related to an application employing the OCR system, to form the reference set of valid xgraphs.

9. The method of claim 8, wherein the character strings related to the application employing the OCR system are character strings previously read by the OCR system.

10. The method of claim 8 wherein deriving a plurality of valid xgraphs comprises:
selecting a plurality of valid xgraphs that occur more frequently than a threshold number of times in the character strings related to the application, to form the reference set of valid xgraphs.

11. The method of claim 8, wherein the application is an item delivery application.

12. The method of claim 1, further comprising
comparing the output solution permutations to a reference set of valid character strings; and
forming a subset of solution permutations containing at least one solution permutation that matches a valid character string in the reference set; and
outputting the subset of solution permutations.

13. The method of claim 12, further comprising
deriving a plurality of valid character strings from a plurality of character strings related to an application employing the OCR system, to form the reference set of valid character strings.

14. The method of claim 13, wherein the character strings related to an application of the OCR system are character strings expected to be read by the OCR system.

15. A comDuter-readable medium encoded with a computer program for resolving an ambiguous character in a character string read by an OCR system, the method comprising:
forming string permutations of the character string by substituting a plurality of replacement characters for the ambiguous character;
deriving xgraphs from the string permutations wherein deriving xgraphs comprises:
dividing a string permutation into a set of multicharacter strings, each multicharacter string having a position in the string permutation; and
categorizing the multicharacter strings according to position in the string permutation;
matching the xgraphs with a reference set of valid xgraphs corresponding to the positions of the xgraphs in the string permutation;
creating solution permutations by removing from the string permutations any string permutation containing an xgraph that does not match a valid xgraph in the reference set; and
outputting the solution permutations.

16. The computer-readable medium encoded with the computer program of claim 15, further comprising:
ranking the solution permutations by likelihood of being a correct interpretation of the character string.

17. The computer-readable medium encoded with the computer program of claim 16, wherein ranking further comprises:
determining the likelihood based on the context of the character string in relation to another character string read by the OCR system.

18. The computer-readable medium encoded with the computer program of claim 16, wherein ranking further comprises:
determining the likelihood based on a predetermined statistic from a plurality of character strings corresponding to the character string read by the OCR system.

19. The computer-readable medium encoded with the computer program of claim 18, wherein the predetermined statistic is frequency of occurrence.

20. The computer-readable medium encoded with the computer program of claim 15, wherein the xgraph is one of a group comprising: a group of two characters, a group of three characters, a group of four characters, and a group of five characters.

21. The computer-readable medium encoded with the computer program of claim 15, wherein the xgraph is one of a group comprising: a leftmost position, a middle position, and a rightmost position.

22. The computer-readable medium encoded with the computer program of claim 15, further comprising:
deriving a plurality of valid xgraph from a plurality of character strings related to an application employing the OCR system, to form the reference set of valid xgraph.

23. The computer-readable medium encoded with the computer program of claim 22, wherein the character strings related to the application employing the OCR system are character strings previously read by the OCR system.

24. The computer-readable medium encoded with the computer program of claim 22, wherein deriving a pluratily of valid xgraph comprises:
selecting a plurality of valid xgraphs that occur more frequently than a threshold number of times in the character strings related to the application, to form the reference set of valid xgraphs.

25. The computer-readable medium encoded with the computer program of claim 22, wherein the application is an item delivery application.

26. The computer-readable medium encoded with the computer program of claim 15, further comprising
comparing the output solution permutations to a reference set of valid character strings; and
forming a subset of solution permutations containing at least one solution permutation that matches a valid character string in the reference set; and
outputting the subset of solution permutations.

27. The computer-readable medium encoded with the computer program of claim 26, further comprising deriving a plurality of valid character strings from a plurality of character strings related to an application employing the OCR system, to form the reference set of valid character strings.

28. The computer-readable medium encoded with the computer program of claim 27, wherein the character strings related to an application of the OCR system are character strings expected to be read by the OCR system.

29. A system comprising:

an OCR imager for creating an image of a character string containing an ambiguous character; and a data processing device that receives the image from the OCR imager and implements the method of claim 1.

30. The system of claim 29, further comprising:

an item sorting device that receives signals output by the data processing device and sorts items according to a name and address on items containing the character strings.

* * * * *

UNITED STATES PATENT AND TRADEMARK OFFICE
CERTIFICATE OF CORRECTION

PATENT NO. : 7,415,171 B2 Page 1 of 1
APPLICATION NO. : 11/390341
DATED : August 19, 2008
INVENTOR(S) : Robert F. Snapp It is certified that error appears in the above-identified patent and that said Letters Patent is hereby corrected as shown below:

In claim 3, column 17, line 5, "OCT" should read --OCR--.

In claim 15, column 17, line 51, "comDuter-readable" should read --computer-readable--.

In claim 22, column 18, line 39, "xgraph" should read --xgraphs--.

In claim 22, column 18, line 41, "xgraph." should read --xgraphs.--.

In claim 24, column 18, line 49, "xgraph" should read --xgraphs--.

Signed and Sealed this

Twenty-fifth Day of November, 2008

JON W. DUDAS
*Director of the United States Patent and Trademark Office*